W. C. HOMAN
Covered Dish.
No. 207,522. Patented Aug. 27, 1878.
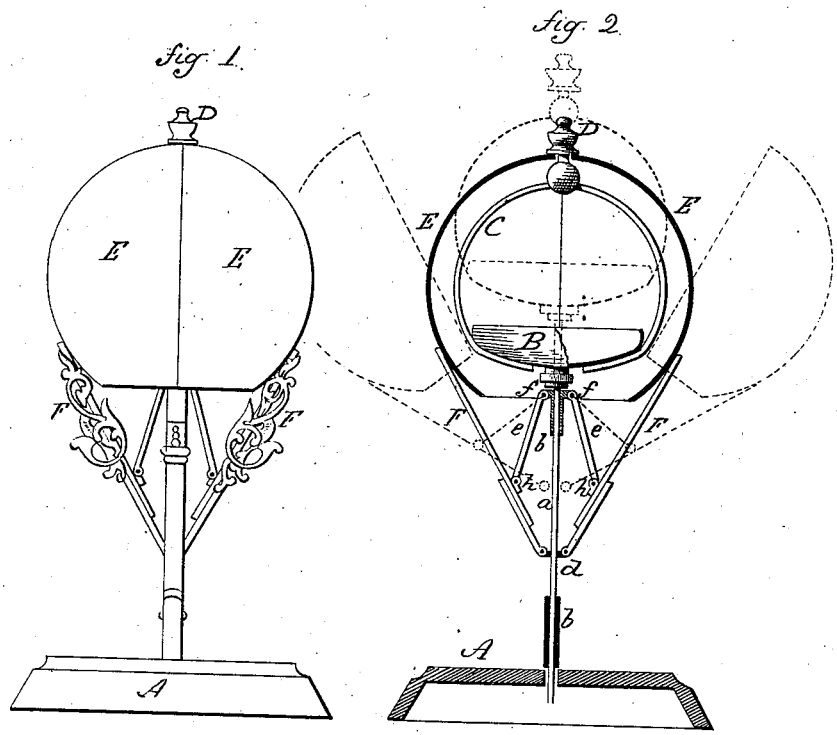
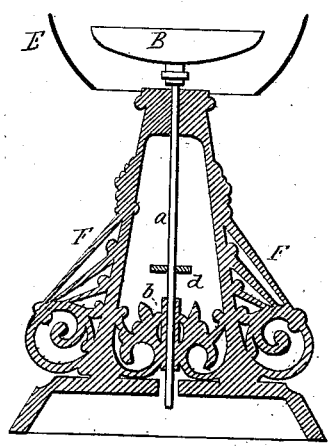
Witnesses:
Wm. C. Homan
Inventor
By Atty

UNITED STATES PATENT OFFICE.

WILLIAM C. HOMAN, OF WEST MERIDEN, CONNECTICUT, ASSIGNOR TO MERIDEN BRITANNIA COMPANY, OF SAME PLACE.

IMPROVEMENT IN COVERED DISHES.

Specification forming part of Letters Patent No. 207,522, dated August 27, 1878; application filed August 8, 1878.

*To all whom it may concern:*

Be it known that I, WM. C. HOMAN, of West Meriden, in the county of New Haven and State of Connecticut, have invented a new Improvement in Covered Dishes; and I do hereby declare the following, when taken in connection with the accompanying drawings, and the letters of reference marked thereon, to be a full, clear, and exact description of the same, and which said drawings constitute part of this specification, and represent, in—

Figure 1, side view; Fig. 2, vertical central section; Fig. 3, sectional view at right angles to Fig. 2.

This invention relates to an improvement in that class of silver or plated articles which consist of a dish or receptacle provided with covers for closing the same, which are opened and closed by mechanical means, and such as used for butter-dishes, jewelry-cases, and various other purposes; and it consists in the construction as hereinafter described, and more particularly recited in the claim.

A is the base on which the receptacle and its covers are supported. $a$ is a vertical spindle, arranged to be raised and lowered, freely working in vertical bearings $b\ b'$, and so as to be supported in a vertical position. On this spindle $a$ the receptacle B is secured, and from the receptacle a bail, C, extends upward to a central knob or convenient handle, D, and so that, by taking hold of the handle D, the receptacle with the spindle may be raised, as indicated in broken lines, Fig. 2.

E E are the two parts of the cover, which, together, as here represented, form substantially a sphere, the division being in a vertical central plane; but the particular shape of the parts of the cover is immaterial to the invention. From each of these parts of the cover an arm, F, extends downward, and hinged to the spindle, as at $d$. To the upper support, $b$, a rod, $e$, is hinged at each side, as at $f$, extending downward, and hinged to the arms F, as at $h$. Therefore, when the spindle is raised the arms F will be also raised, and this will cause the rods $e$ to turn outward, and consequently spread the arms F and open the covers, as indicated in broken lines, Fig. 2, exposing the receptacle between the covers, as shown.

When the covers are wide open the weight is carried so far from the center that they remain open by their own gravity; but when nearly closed the center of gravity is changed, and the covers close from that point by their own gravity, and remain closed.

A notch is made in the parts of the cover to close around the neck of the handle D.

The handle and bail may be dispensed with, and the covers opened by applying the power to either or both of the covers; but the central handle is more convenient.

It will be understood that the particular form of the parts shown is a question of design, and not material to this invention; and it is to be further understood that no claim is broadly made to a pair of hemispherical covers hinged so as to be turned respectively to the right and left inclosing a receptacle, as such is not new; but

What is claimed as new, and desired to be secured by Letters Patent, is—

A receptacle attached to or made a part of a vertically-movable spindle, combined with a pair of covers divided in a vertical central plane, hinged below to the movable spindle, which supports the receptacle, combined with a rod from each of the said covers, hinged to the stationary support for the spindle above the hinging-point of the covers, and also hinged, respectively, to the covers between the hinging-point of the covers and the stationary hinging-point of the said rods, substantially as described.

WM. C. HOMAN.

Witnesses:
E. A. MERRIMAN,
LELAND H. IVES.